United States Patent [19]

Raubenheimer

[11] E Re. 31,176

[45] Reissued Mar. 15, 1983

[54] CARTON DIVIDER

[75] Inventor: Wallace O. Raubenheimer, Lebanon, N.J.

[73] Assignee: Jefferson Smurfit Incorporated, Alton, Ill.

[21] Appl. No.: 170,591

[22] Filed: Jul. 21, 1980

Related U.S. Patent Documents

Reissue of:

[64] Patent No.: 4,103,818
Issued: Aug. 1, 1978
Appl. No.: 780,517
Filed: Mar. 23, 1977

[51] Int. Cl.[3] ..... B65D 5/48

[52] U.S. Cl. ..... 229/15; 206/459; 217/32; 229/42

[58] Field of Search ..... 229/15, 42; 217/31, 217/32, 22; 206/459

[56] References Cited

U.S. PATENT DOCUMENTS

| | | | |
|---|---|---|---|
| 213,848 | 4/1879 | Stevens | 217/32 |
| 324,999 | 9/1885 | Jaeger | 217/32 |
| 456,353 | 7/1891 | Bower | 217/32 |
| 529,173 | 11/1894 | Herr | 217/32 |
| 533,331 | 1/1895 | Williams | 217/32 |
| 654,508 | 7/1900 | Bohn | 217/32 |
| 658,930 | 10/1900 | Starman | 217/32 |
| 1,143,036 | 6/1915 | Carter | 217/31 |
| 1,442,280 | 1/1923 | Lorentzen | 217/34 |
| 1,528,341 | 3/1925 | Navarro | 217/31 |
| 2,128,015 | 8/1938 | Sechrist . | |
| 2,175,670 | 10/1939 | Rutledge | 217/32 |
| 2,920,782 | 1/1960 | Butters | 229/15 |
| 3,767,106 | 10/1973 | Morgan . | |
| 3,948,435 | 4/1976 | Palmer | 229/15 |

FOREIGN PATENT DOCUMENTS

| | | | |
|---|---|---|---|
| 373280 | 4/1939 | Italy | 217/31 |

OTHER PUBLICATIONS

Drawings of divider by Clevepak Corp. of New York, N.Y., known prior to 3/23/77.

*Primary Examiner*—Allan N. Shoap
*Attorney, Agent, or Firm*—Brooks, Haidt, Haffner & Delahunty

[57] ABSTRACT

A bottle-carton divider is formed by interlocking cross-partitions each having a laterally projecting tab located along the length of, and extending into the half-height vertical slot of the partition by which the interlock with a cross-partition is effected. A tab-receiving opening is formed in each partition having an edge at a location spaced below but in alignment with the referred to vertical slot. The shapes, comparative sizes, and other relationships between the vertical slot, the tab, and the tab-receiving opening formed in any partition are such that, when the divider is assembled, the locking tab on any partition engages and overlaps the referred to edge of the tab-receiving opening of the adjacent, interlocked partition, producing a pair of oppositely-directed abutment interfaces which restrain the locking tabs against disengagement in both directions along the line of intersection between the two, both in the opened condition and in the collapsed condition of the divider.

21 Claims, 9 Drawing Figures

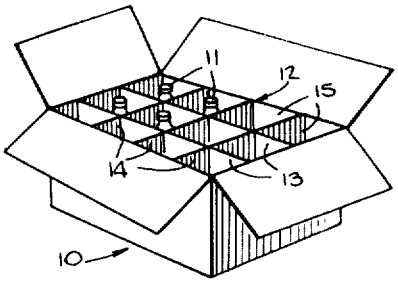
Fig. 1.
Fig. 8.
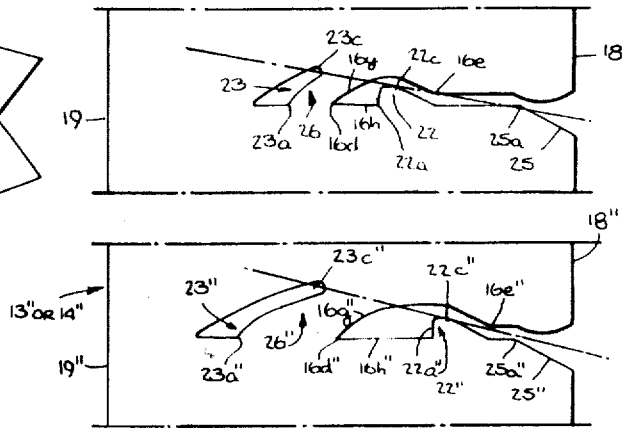
Fig. 9.
Fig. 6.
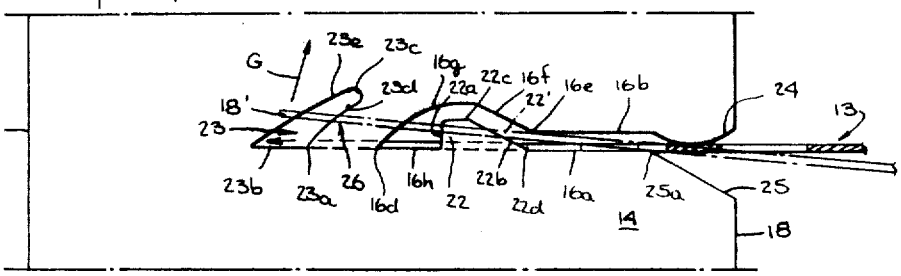
Fig. 7.
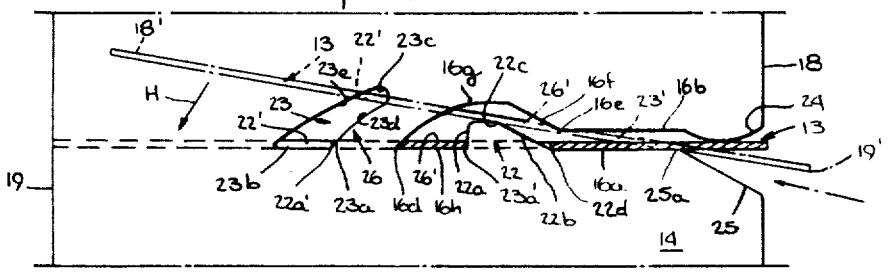

CARTON DIVIDER

Matter enclosed in heavy brackets [ ] appears in the original patent but forms no part of this reissue specification; matter printed in italics indicates the additions made by reissue.

FIELD OF THE INVENTION

This invention relates to collapsible space dividers for containers such as cartons in which a quantity of bottles or the like are packed and shipped. More particularly, the invention relates to the manner and means by which the several intersecting longitudinal and transverse partitions are interlocked with each other to form the unglued, grid-like divider which, when placed in its erected condition within a carton, will receive and separate the bottles from contact with each other. Although it may have other uses, the invention was made while attempting to improve such interlock of the partitions in common chipboard dividers for use within plastic-bottle carrier cartons, and therefore will be described in connection with such use.

BACKGROUND OF THE INVENTION AND THE PRIOR ART

The connection along the imaginary vertical line of conjuncture between any two vertically disposed and criss-crossing partitions in such dividers is commonly effected using a half-height slot in each partition for receiving a similar but oppositely facing, half-height slot in the comating cross-partition. This slot connection at each intersection between the longitudinal and transverse partitions is usually maintained by a tab-interlock which, for example, may be formed by the engagement of an integral tab on one partition, which projects laterally from one side and across the open end at the top of its referred to slot, with a notch formed either in the top edge of the connecting cross-partition, or with a tab-receiving opening located intermediate the height of the cross-partition. Compare, for example, U.S. Pat. No. 3,948,435 (Palmer) with U.S. Pat. No. 2,920,782 (Butters). As also illustrated in both of the referred to U.S. patents, a similar tab interlock may also be formed at the opposite end, or at a corresponding but opposite location along the same conjuncture. Another alternative found in the prior art is the use of but a single tab-interlock centrally within the height of the intersecting planar partitions, rather than at the top and bottom ends of their slot connections, the centrally located tab being formed extending laterally across the half-height slot on only one of the two interlocking partitions, the other partition having a tab-receiving opening located below its half-height slot. In this arrangement, it will be noted that the configurations of the two interlocking partitions are not the same.

Such conventional partition interlock arrangements are very effective for holding the rigidity and preventing the coming apart of the several parts of the divider when it is in its opened or erected condition. However, insofar as is known, prior interlock arrangements have not adequately retained an effective and relatively rigid interlock between the partitions when the divider is in its collapsed condition, as it appears prior to its erection and placement within a carton. During handling of such collapsed dividers as, for example, when being stacked on each other either for shipment or for movement to a carton assembly station, or when such stacked, collapsed dividers are being loaded into the magazine of an automatic carton filler machine for subsequent individual erection and insertion into cartons, the partitions which form each divider are loosely interlocked and tend to slide and pivot laterally with respect to each other so that one or more dividers in the stack may become at least partly disassembled. In automatic carton filler machines the collapsed dividers are fed from the bottom of the magazine stack one at a time, using a laterally reciprocating blade which may separate the partitions in any given divider if the blade does not meet the collapsed divider squarely, or if the partitions have already partially separated. Further, the air suction cup apparatus, which is commonly a part of such filler machines and which opens or erects each divider for insertion into a carton, may distort or produce dropout of one or more partitions from any divider as it is opened, if its partitions are not firmly interlocked in the collapsed condition. In all such instances, the untimely coming apart of such dividers interrupts the work routine or any highspeed carton-assembly production, and requires reassembly or waste of the divider partition elements.

Accordingly, an important object of the present invention is to facilitate the handling of such dividers when in their collapsed condition, such as when they are being moved about or being stacked in a carton filler machine, by redesign of the partitions which make up each divider so that they will fairly rigidly interlock with each other when the divider is collapsed, as well as when the divider is opened or erected. Of course, the interlocking arrangement must be such as will not interfere with the free pivotal movement of the interlocked partitions about the axis of each partition intersection as the divider is opened, and must retain the interlock during such opening movement. The formed positive interlock between the partitions when the divider is in its collapsed as well as its opened condition promotes line production techniques by eliminating interruption in the operation of automatic divider inserting equipment as the dividers are opened and placed within their respective cartons.

In addition, the divider must be capable of easy assembly from its partition parts, and this in turn requires that the interlock arrangement must permit easy moving together and interlocking of the partitions.

Further, such convenient assembly of the divider must be done on conventional divider assembly machines, such as those of the wheel type, and the partitions in the resulting divider must be at least as rigidly interlocked in the opened condition of the divider as they are in previously known satisfactory dividers. However, it is believed that the invention improves this firmness or rigidity of the opened cell structure, as well as that of the collapsed divider.

It is also an object of the invention to provide such positive slot-locking using longitudinal and transverse interlocking partitions whose slot and tab configurations are identical. Such uniformity in shape provides uniform cutting of the interlocking elements which, in turn, ensures uniformity in the length, width and height of the bottle-receiving cells formed by the completed divider. Thus, using automatic case loaders and filling lines, continual and uniform indexing of the cartons for receiving bottles in the respective cells, is assured.

SUMMARY OF THE INVENTION

Briefly describing the invention in its preferred embodiment, a carton divider is provided in which its upright longitudinal and transverse partitions are interlocked with each other along a slotted connection by a pair of oppositely directed locking tabs located within the common height of the partitions. The respective tabs in the pair are formed on each of the partitions, each tab projecting laterally across the imaginary axis of the vertical, half-height connection slot formed in the partition. When the partitions are interlocked, an edge of each tab is in abutting engagement with an oppositely facing edge of a tab-receiving cut-out formed in the adjacent partition, there then being two vertically spaced apart and oppositely directed abutment interfaces formed along the length of the connection to prevent disengagement movement in either direction along the line of intersection between the interlocked partitions.

Such interlocked relation is maintained not only in the opened or erected condition of the divider, but also in its collapsed condition. In the latter condition, the tab on each partition continues to project through the tab-receiving opening of the other partition and overlaps an edge of the opening which lies along the imaginary axis of the connection. Thus, the invention may be said to be characterized by the overlapped condition of each tab with respect to its adjacent, interlocked partition when the divider is in its collapsed condition, and the appearance on the same side of the collapsed divider of both of the oppositely directed tabs in any such pair thereof.

However, such overlap occurs only when the divider is "collapsed" in the proper direction. That is, if the assembly is collapsed in the reverse direction the tab interlock is not maintained, and the partitions can be easily separated while the divider is in such reversely collapsed condition. The assembled divider can therefore be easily disassembled, if such should for any reason be desirable, by simply reversing the direction of collapse of the collapsed divider. Direction-identification notches located on the appropriate ends of the partitions, as will be described, indicate the proper direction of collapse and opening of the divider.

A further feature of the invention becomes apparent when assembly of the divider is made from its individual partition members. Such is done in a conventional manner, with the partitions to be interlocked being oriented at right angles with respect to each other so that the divider is formed in its "opened" condition. It will be found that, because of the shapes and relationships of the interlocking parts, a very snug-fit, somewhat approximating a "snap-in" fit, is effected between the interlocked partition elements. In this regard, it will be noted that there is virtually no "play" between them, whether the divider is in an opened condition or in its properly collapsed condition. A partition support tab, located adjacent to the open end of the slot in each partition, and projecting laterally part way across the slot, promotes such rigidity in the erected divider by pressing each interlocking partition against the opposite side of the slot. The referred to snug-fit engagement of the locking tab within the tab-receiving opening of the interlocked partition presses the latter in the same direction below its midpoint, thus rigidly retaining the interlock, as will be seen.

Because of the novel interlocking arrangement, such rigidity of the divider in its erected condition is attained regardless of the width of the slots of each of the interlocked partitions. That is, in the preferred embodiment to be described, this slot width is made relatively wide as compared with the thickness of each partition for manufacturing reasons, yet a rigid interlock is achieved.

DETAILED DESCRIPTION OF PREFERRED EMBODIMENTS

These and other objects, features and advantages of the invention will be apparent from the following detailed description of the invention, in which reference is made to the accompanying drawings. In the drawings:

FIG. 1 is a perspective view of a carton partly filled with bottles or the like, and having a carton divider in accordance with the invention inserted therein to form respective cells for the individual bottles;

FIGS. 6 and 7 are enlarged fragmentary side views which, together, show the progression of engagement of the interlock of one partition with another when assembling a carton divider in accordance with the invention;

FIG. 8 is a fragmentary plan view of only the slot and cutout portions of a preferred form of partition for assembling a carton divider in accordance with the invention; and FIG. 9 is a similar fragmentary plan view of a modified form of partition for assembling a carton divider in accordance with the invention.

Figure 2:
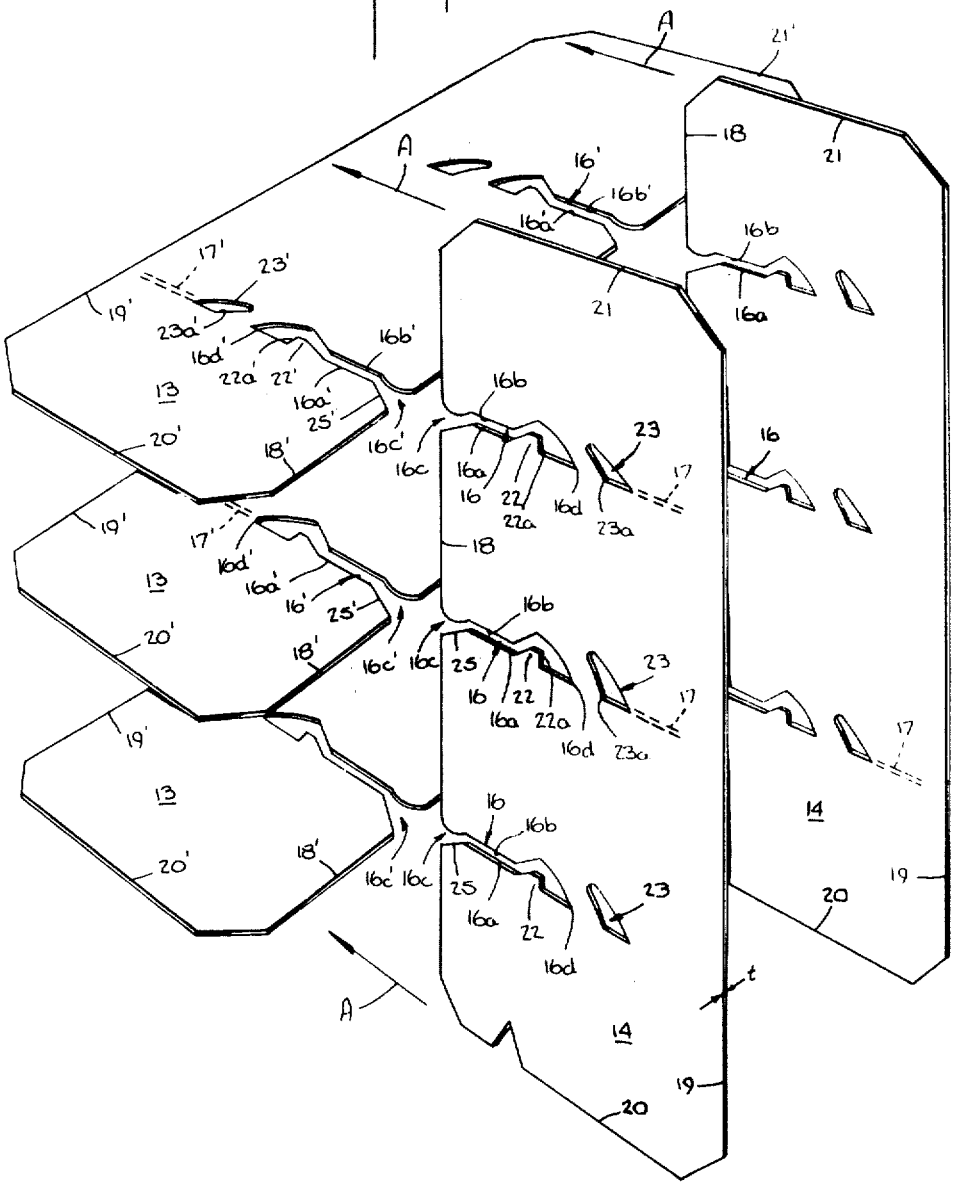
FIG. 2 is an enlarged perspective showing of several longitudinal and transverse partitions about to be assembled to form a carton divider in accordance with the invention.

Referring to FIG. 1, a corrugated cardboard carton 10, for packing and shipping a dozen glass or plastic bottles 11 (only four of which are shown), has a carton divider therein which is made in accordance with the invention and is generally indicated by reference numeral 12. The divider 12, whose two longitudinal partition parts 13 and three transverse partition parts 14 are made of chipboard, divides the interior space of the carton 10 into a number of bottle cells 15, in this case one dozen, for respectively receiving and protecting the individual bottles 11 during shipping and rough handling. In the illustrated embodiment, the carton divider 12 is a full-height divider, i.e., its height is equal to that of the bottles 11, but it will be understood that a divider 12 in accordance with the invention may be made greater or less than full-height in particular applications, as is conventional.

Although the drawings illustrate a divider 12 in accordance with the invention which has two longitudinal partitions 14 and three transverse or cross-partitions 13, it will also be understood that the invention is effective for conjoining only two partitions in criss-cross fashion, such as a pair of equal-length partitions which are interlocked centrally of their respective lengths to form a 4-cell divider for a carton intended to hold only four bottles. Of course, dividers having a great many more longitudinal and transverse partitions for providing, say, several dozen cells in a carton in which many small bottles will be packed, may also be made in accordance with the invention.

The separate partition parts 13 and 14 (hereinafter referred to simply as "partitions") which are assembled to form the carton divider 12, and the manner of their assembly, is more clearly illustrated in FIG. 2. That is, using a conventional carton divider assembly machine (sometimes called a "partition assembly machine"), the three transverse partitions 13 are somewhat loosely held by the machine (not shown) in a horizontal and parallel, equally spaced apart relation to each other as illustrated, whereupon the two vertically held, equally spaced apart longitudinal partitions 14, appropriately positioned as shown, are moved forwardly, in the direction of the arrows A, so that their open-ended slots 16 are moved into the corresponding oppositely directed open-ended slots 16 of the partitions 13.

(Although the parts are identical in shape and size, for clarity of understanding, the corresponding elements of partition 13 have been given a prime (') designation in the drawings, and will be so indicated where necessary in the following description).

The partitions 14 are forced by the machine into interlocking engagement with the partitions 13, the interlock being by engagement of the respective parallel side edges 16a, 16b (and 16a', 16b') of any of the partition slots 16 (and 16') with a surface portion generally indicated in dotted lines at 17 and 17' of the engaged partition. The surface portion 17 (or 17') is only that area which is in alignment with the slot 16 (or 16') of the partition. Thus, the partitions 13 and 14 are fully inserted and joined together with all of the first side edges 18, 18' of one group of partitions aligned with all of the second side edges 19, 19' of the group of cross-partitions, in the manner illustrated in FIG. 3.

Figure 4:
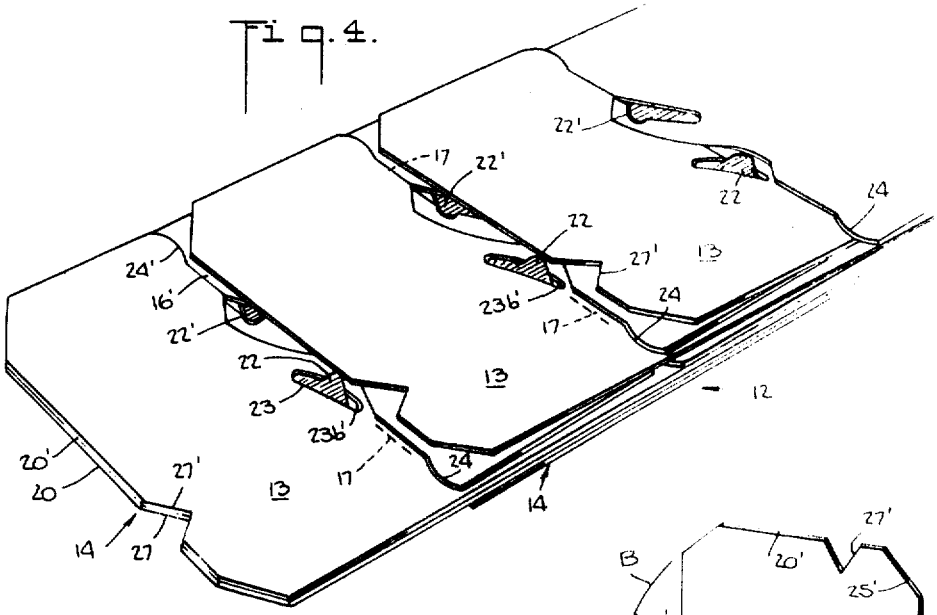
FIGS. 3 and 4 are similar perspective showings of the assembled carton divider as it appears, respectively, in its erected condition and its collapsed condition.
Figure 3:
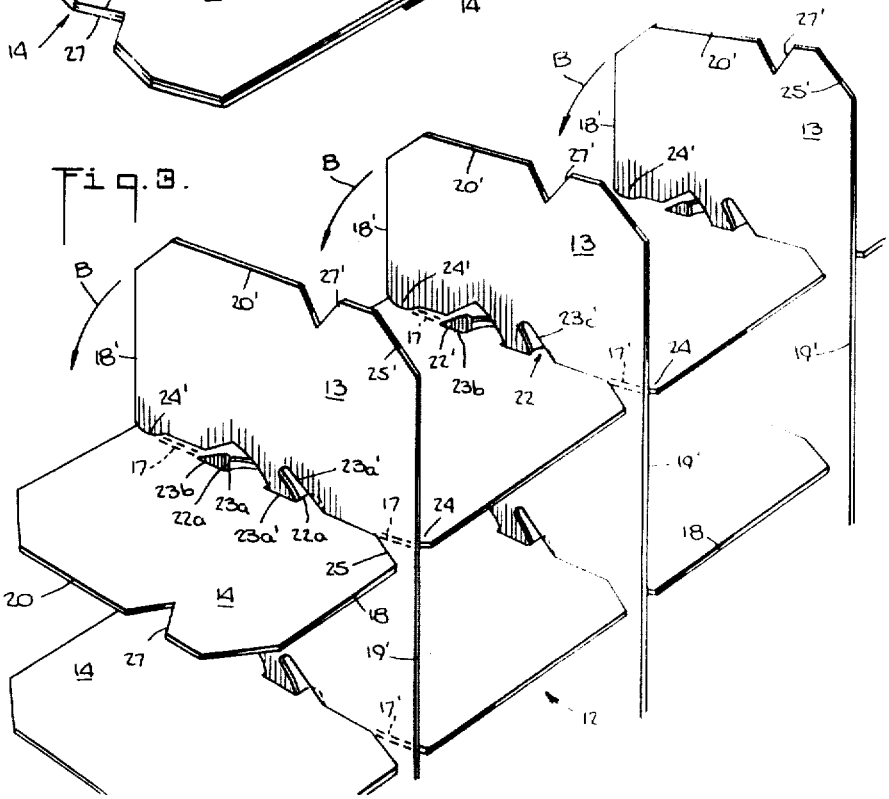

As will be understood from a comparison of FIGS. 3 and 4, the assembled carton divider 12 can be collapsed laterally, in the direction of the arrow B in FIG. 3, from its opened or erected condition as seen in FIG. 3 in which the longitudinal and transverse partitions 13, 14 are disposed at right-angles to each other, to a collapsed condition as seen in FIG. 4 in which the partitions 13 and 14 are parallel and lie adjacent to each other. During the collapsing and opening of the divider its longitudinal and transverse partitions pivot with respect to each other about the respective imaginary lines of intersection between their planes, which imaginary lines are also indicated by dotted lines 17 and 17' in FIGS. 3 and 4.

The collapsed dividers as seen in FIG. 4 may be stacked on each other for transporting to and loading in a carton divider inserting machine (not shown) from which they are automatically dispensed one at a time from the bottom of the stack, and then automatically erected using air suction cup apparatus (not shown) and inserted into respective bottle cartons which pass through the machine. Although for clarity the machine itself and its parts have been omitted, FIG. 5 illustrates in somewhat diagramatic fashion the sequence of feeding, erecting, and inserting of the dividers in such a divider insert machine.

Figure 5:
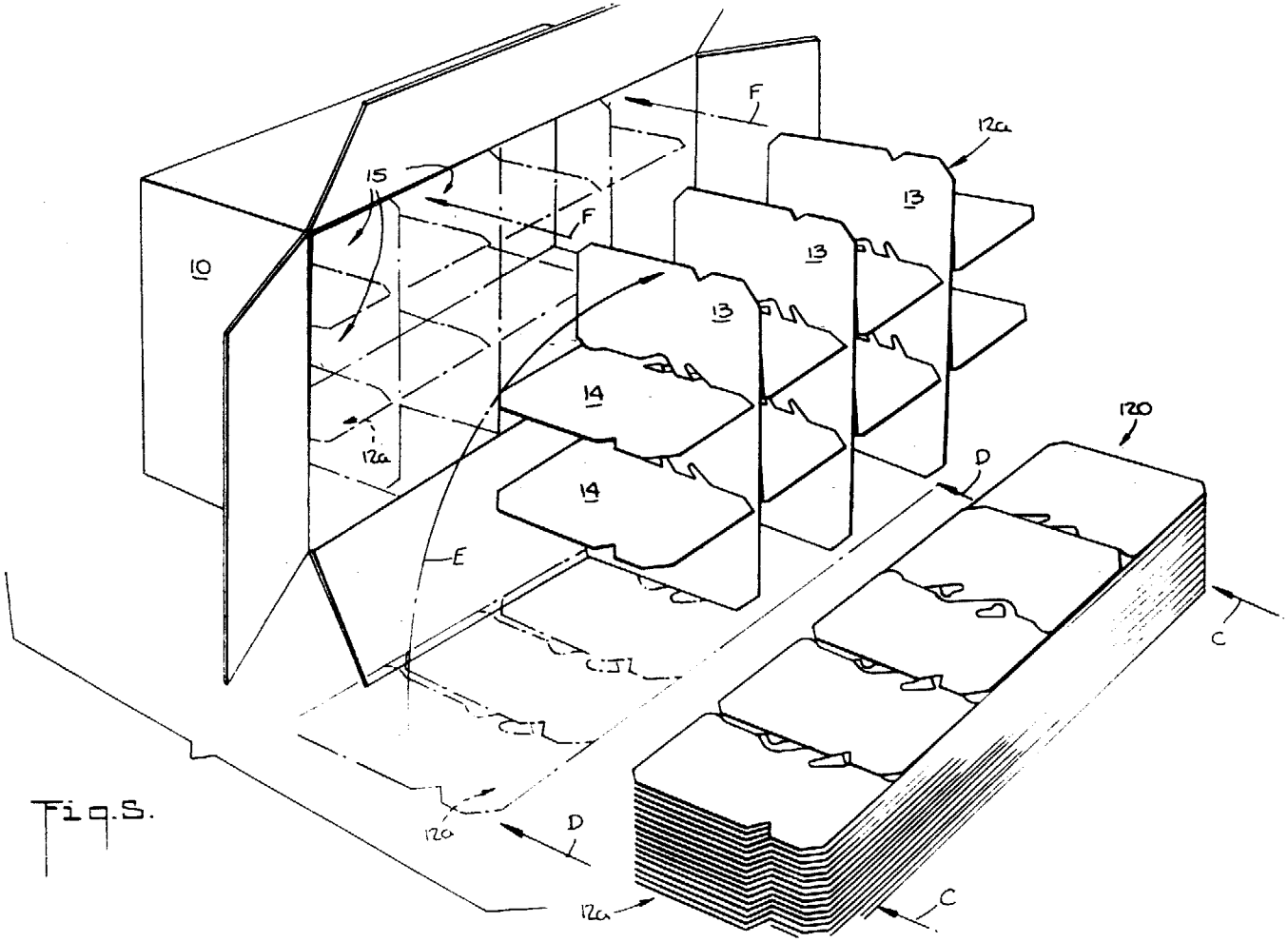
FIG. 5 is a perspective and diagrammatic illustration showing the sequence of steps involved in feeding a carton divider in accordance with the invention from the bottom of the stack of collapsed dividers, erecting the divider, and inserting the divider into a carton, as the sequence would be performed in a conventional automatic divider-inserting machine (not shown)

That is, a stack of dividers is generally indicated by reference numeral 120 in FIG. 5, as the stack would appear when loaded in the divider magazine of such a machine. By the movement in the direction of arrows C of a reciprocating feeder blade (not shown) of the machine, the bottommost divider 12a is fed off the bottom of the stack, as indicated by arrows D, while still in its collapsed condition, to the dotted line position 12a in FIG. 5. In that position it is grasped appropriately by air suction cups (not shown) and erected, by pivoting its transverse partition elements 13 in the direction of arrow E to the illustrated full-line position of the divider. Thereafter, the upright divider 12a is moved laterally, in the direction of arrows F, into a carton 10 which is indexed into and out of the machine on its side, as shown.

It will be noted that, were the partition elements 13 and 14 not securely interlocked with each other, there is a likelihood that any given divider 12 may become wholly or partly disassembled, by complete or partial separation of one or more of its partition elements, due to any of such intended movements of the divider through the divider-insert machine. However, in the past such separation of the partition elements is more likely when the divider is in its collapsed condition, because the slot configurations by which the interlock between any two intersecting partitions have previously been produced, have been effective to prevent such disengagement only when this divider is in its opened condition. Thus, as previously mentioned and as now will be described in detail, the present invention provides a partition slot configuration which is effective to securely interlock the intersecting partitions while the divider is in its collapsed condition, as well as while it is in its opened or erected condition.

With reference to the transverse and longitudinal partitions 13 and 14 as each is seen in its entirety for example in FIG. 2, it will first be noted that the slot configurations and interlocking elements of all the partitions are the same. Of course, such is an advantage in terms of uniformity of manufacture of all of the partitions regardless of their lengths, and convenience of assembly especially when cross-partitions of the same length are being assembled to make the dividers 12.

Each of the planar partitions 14 and 13 as seen in FIG. 2 has a plurality of cross-partition engagement slots 16, 16' which extend generally parallel to the opposite end edges 20, 20' and 21, 21' of the respective partitions at equally spaced apart locations along the length of the partition. The spacing apart of the slots 16 and 16' determines the size of each bottle cell 15 (FIG. 1), as will be apparent.

With reference to either partition 14 or 13, the generally parallel opposite side edges 16a, 16b (or 16a', 16b') of each slot 16 (or 16') extend inwardly from the open end of the slot, generally indicated by numeral 16c (or 16c') at the first edge 18 (or 18') of the partition, to a closed end 16d (or 16d') of the slot at an intermediate location across the width of the partition as shown. As will also be apparent, any two cross-partitions 13 and 14 are assembled and interlocked by, for example, moving the open end 16c of a slot 16 (or 16') of one of them into the oppositely extending slot 16' (or 16) of the other, the width of each slot between its edges 16a, 16b (or 16a', 16b') being adequate to receive the thickness t (FIG. 2) of the cross-partition.

The two partitions 13 and 14 are so moved together to the fullest possible extend so that, when fully engaged with each other, the edge provided by the closed end 16d (or 16d') of one will normally abut the edge provided by the closed end 16d' (or 16d) of the other. The coming into abutment of these oppositely facing end edges 16d (16d') determines the depth of engagement of either partition with respect to the other. Although here shown as being at the midpoint of each partition, the location of such engagement may be at another location within the width of either or both partitions in the manner shown, for example, in the aforementioned U.S. Pat. No. 2,920,782 (Butters) in which the respective partitions extend only partly into each other so that their respective upper and lower edges do not lie in the same planes with those edges of the cross-partitions.

At an intermediate location along the length of each slot edge 16a (or 16a') a locking tab 22 (or 22') projects laterally into the path of the slot 16 (or 16') to provide an abutment edge 22a (or 22a') which faces away from the slot open end 16c (or 16c'), i.e., in the direction opposite to that of the abutment edge provided by the slot closed end 16d (or 16d'). Preferably, and as shown, this abutment edge 22a (or 22a') projects perpendicularly with respect to the slot edge 16a (or 16a').

When any two cross-partitions such as the partitions 13 and 14 are interlocked, the locking tab 22 (or 22') *of* each will be received in a tab-receiving opening 23' (or 23) of the other partition, and its abutment edge 22a (or 22a') will be in engagement with an abutment edge 23a' (or 23a) which is provided by such opening, as best understood by comparing FIGS. 2 and 3. It will be noted that, with respect to any partition slot 16 (or 16'), the edge 23a, 23a' also faces away from the open end 16c, 16c' of the slot, as does the tab edge 22a, 22a'. Thus, and with particular reference to FIG. 3, it will be noted that this engagement between the two oppositely facing tab edges 22a, 22a' and two oppositely facing edges 23a, 23a' of the openings 23, 23' when any two cross-partitions are interlocked, provides a pair of oppositely directed abutment edge interfaces, at spaced apart locations along the imaginary line 17, 17' of their intersection, which substantially prevents disengagement of the interlocked partitions. That is, neither partition is easily moved with respect to the other in either direction along the line of intersection between them.

By reason of the straight edges 23b, 23b', formed by the respective tab-receiving openings 23, 23' of the two partitions, this two-directional interlock is maintained even when the divider 12 is in its collapsed condition as shown in FIG. 4. That is, the straight edges 23b and 23b' are respectively aligned with, and are in effect continuations of the slot edges 16a, 16a', on any partition and, as illustrated in FIG. 4, the tab 22 of the interlocked cross-partition 14 will overlap and is retained in position by the edge 23b' of the partition 13 when the divider 12 is collapsed in the direction shown. It will be noted that any pivoting or sliding movement of one partition with respect to the other as would permit the partitions to disengage while the divider is in its collapsed condition is substantially prevented by such overlapping of the tabs 22, 22' with the tab retainer edges 23b', 23b which occurs on the same side of the collapsed divider.

The rigidity of the divider 12 in its opened condition as shown in FIG. 3 is enhanced by a cross-partition support tab 24 (or 24') which projects only part way across the width of the slot 16 (or 16') from the side edge 16b (or 16b') of the slot at its open end 16c (or 16c'). That is, the distance of projection is such as will firmly retain the cross-partition surface area 17 (or 17') against the first edge 16a (or 16a') of the slot, considering that another portion of the cross-partition towards its other end is restrained in the same direction by the engagement interface between the respective substantially V-shaped closed ends 16b (or 16b') of the engaged slots, and by the engagement of the tabs 22 (or 22') with edges 23b (or 23b') of the respective tab-receiving openings 23' (or 23).

Although the slot width can be narrower to approximately equal the partition thickness t, for convenience in cutting during manufacture each slot 16, 16' is made wider than the thickness t of any partition. In the preferred embodiment, the slot width between the parallel side edges 16a, 16b (or 16a', 16b') is 5/32 inch, whereas the thickness t of any partition is approximately 3/64 inch. This relatively wide slot permits the partition to slide easily together during assembly, and also accomodates the momentary angular disposition of one partition 13 with respect to the other partition 14 which takes place as they are being assembled, as the tab 22' of the partition 13, in effect, "rides over" the tab 22 of the partition 14, as illustrated in FIG. 6. That is, as the slot of the partition 13 is moved into engagement with the oppositely facing slot of the partition 14 (or vice versa), first its support tab 24' and then its locking tab 22', and finally its surface portion 26' between the closed end 16b' of its slot and the edge 23a' of its tab-receiving opening 23', sequentially ride up the sloping edge 22b of the tab 22 on the partition 14, as indicated by a comparison of FIGS. 6 and 7. During such movement the partition 13 pivots in the direction of the arrow G in FIG. 6. Of course, because its corresponding elements must also "ride over" the tab 22' on the partition 13, the partition 14 will also assume an angular disposition with respect to the partition 13, but in a direction displaced 90° with respect to the direction of the first mentioned angular disposition between the same partitions. Thus, the relatively wide slots 16 and 16' minimize bending and possible distortion of the partitions, and cause them to slide together more readily as in an automatic assembling machine. In addition, the slot edge 16a, 16b' is chamfered, as at 25 (or 25'), at the open end 16c, 16c' of the slot 16, 16' opposite to the cross-partition support tab 24, 24', to further minimize bending of the other partition during assembly.

As indicated in FIG. 7, the location of the arcuate open portion 23c (or 23c') of the tab-receiving opening 23 (or 23'), on the side thereof opposite the edge 23b, (or 23b') and which initially receives the locking tab 22' (or 22) of the cross-partition as the two are moved together, is determined by the momentary maximum angular relationship betwen the partitions as illustrated by dotted lines in FIG. 7. This location of the open portion 23c corresponds with the location of the tab 22' of the partition which is being interlocked therewith as it arrives at such maximum angular disposition. Of course the width of the open portion 23c is sufficient to accomodate at least the length of the peak edge 22c' of the saw-tooth shaped tab 22' on the other partition.

Some flexing of both partitions 13 and 14 will occur as they move into interlocking engagement. Thus, the sizing and relationships of the comating elements is a compromise between the amount of such flexing as can be tolerated during a high-speed assembly operation and the desire to achieve a close "snap in" fit as the partitions attain their fully interlocked relationship.

Thus, with reference to FIG. 7, the innermost corner 25a (or 25a') of the chamfered edge 25 (or 25') is substantially aligned with the tab peak edge 22c (or 22c') and the slot corner edge 16e (or 16e'), the latter being defined by the juncture between the slot edge 16b (or 16b') and the slope portion 16f (or 16f') of the same slot edge. The slope portion 16f (or 16f') is parallel to the sloping edge 22b (or 22b') of the tab 22 (or 22') and is spaced therefrom approximately the same distance as the slot width between edges 16a (or 16a') and 16b (or 16b'), i.e., about 5/32 inch in the preferred embodiment.

The arcuate edge 16g (or 16g') which extends from the inner end of the slope portions 16f (or 16f') to the closed end 16d (or 16d') of the slot 16 (or 16') has a radius of approximately 15/16 inch in the preferred embodiment, and thus the opposite side edge of the slot is faired around the tab 22 (or 22') including its peak edge 22c (or 22c') so that the slot width is maintained, and so that the arcuate portion 16g (or 16g') guides the slot closed end 16d (or 16d') of the other partition into abutting relationship with its slot closed end 16d (or 16d') as the surface portion 26' (or 26) of the other partition "rides off" the tab 22 during the assembly. In other words, the arc of the portion 16g approximates the locus of imaginary points generated by the slot closed end 16d' of the other partition during the movement of the other partition in the direction of arrow H in FIG. 7 beyond its maximum angular disposition indicated by dashed lines in that Figure.

When the partitions 13 and 14 are fully interlocked as indicated by the full line showing in FIG. 7, the surface portion 26 (or 26') of one partition lies against a second straight edge portion 16h (or 16h') of the other (i.e., the portion 26' of partition 13 lies against slot edge portion 16h of partition 14 in FIG. 7), the length of the slot edge portion 16h (or 16h') being substantially equal to the length of the portion 26 (or 26') between the slot closed end 16d (or 16d') and the abutment edge 23a (or 23a') of the tab-receiving opening 23 (or 23'). As will be noted, the slot edge portion 16h (or 16h') is aligned with the slot edge 16a (or 16a') and with the tab retainer edge 23b (or 23b') of the tab-receiving openings 23 (or 23').

For the same reasons, the configurations of the opposite side edges 23d and 23e of the somewhat triangular-shaped tab-receiving opening substantially correspond with the locus of imaginary points generated by the bite-edge 22a' of the tab 22' and by its opposite sloping edge 22b' as the tab 22' on the other partition moves, in the direction of arrow H in FIG. 7, within the tab-receiving opening 23 during assembly. That is, the innermost edge 23d is arcuately shaped, and somewhat parallels the arcuate slot edge portion 16g as will be noted in FIG. 7, and such arcuate shape generally corresponds with the path of the tab bite-edge 22a' of the other partition during the assembly of the two partitions. The opposite tab-receiving opening edge 23e is substantially straight, and generally corresponds with the path of the tab sloping edge 22b' during such assembly.

It will further be noted that the length of the tab-retainer edge 23b is substantially equal to the length of the tab 22' between its bite-edge 22a' and the foot end 22d' of its sloping edge 22b'.

Thus, when any two cross-partitions 13 and 14 are assembled, they are rigidly interlocked by the close-fit of their parts as well as by their described features, when the assembled divider is both in its opened condition and in its collapsed condition. The interlock is retained in both directions along the imaginary line 17, 17' of their conjuncture by the pair of oppositely directed abutment interfaces formed between the two partitions by the respective abutments between the tab bite-edges 22a, 22a' and the tab-receiving opening abutment edges 23a, 23a' of each partition, as perhaps best seen in FIG. 7. The interlock is further enhanced by the third abutment interface provided by the abuting engagement of their slot closed ends 16d, 16d', also seen in FIG. 7.

Referring now to a comparison between FIGS. 8 and 9, it will be understood that the tab 22' and tab-receiving opening 23'' in an alternative embodiment 13'' or 14'' of the interlocking partitions may be disposed nearer to the respective partition edges 18'' or 19'' as illustrated in FIG. 9, rather than centrally of the partition as in the preferred embodiment whose illustration is repeated in FIG. 8. However, referring to the alternative embodiment shown in FIG. 9, it will be noted that the length of the slot edge portion 16h'' adjacent to the tab edge 22a'' must always be at least equal to the length of the surface portion 26'' between the closed end 16d'' of the slot and the abutment edge 23a'' of the tab-receiving opening 23'', so that the portion 26'' of one partition can be received in the opening defined by the opposite slot edges 16h'' and 16g'' and tab edge 22a'' of the other partition.

As a further alternative, and although not illustrated, the edge portion 16h, 16h' or 16h'' could be made longer so as to eliminate the third abutment interface between the slot closed ends 16h, 16h' or 16h'', if desired for any reason, although the still interlocked assembly would not be as rigid as in the preferred arrangement.

Referring again to the FIG. 9 embodiment, it will also be noted that the tab-receiving opening 23'' will be more elongated in order that its open portion 23c'', opposite the tab-retainer edge 23b'', will be positioned to receive the tab 22'' of another partition as the two are assembled. In this regard it will be noted from the dashed line showing that the substantially straight line relationship between the open portion 23c'', tab peak edge 22c'', slot corner edge 16e'' and chamfered portion corner 25a'' is maintained in the alternative embodiment, as in the preferred embodiment of FIG. 8 as previously described.

Further, it should be noted that, although in the preferred embodiment and in the illustrated alternate embodiment of FIG. 9 the slot end 16d (or 16d' or 16d'') is located at the center of the width of the partition so that the corresponding partition edges 18, 19 (or 18', 19' or 18'', 19'') of the assembled divider are within the same plane, the slot closed end 16d (or 16d' or 16d''), the tab 22 (or 22' or 22''), and the tab-receiving opening 23 (or 23' or 23'') may be relocated nearer to either of the partition edges 18 or 19 (or 18', 18'', 19' or 19''), preferably towards the edge 18 (or 18' or 18''), where in the assembled carton divider the top and bottom edges of the longitudinal and transverse partitions are not intended to lie within the same respective planes. It will also be understood that, so long as the slot configurations of the interlocking partitions coincide, the height of either of the two partitions may be less than that of the other, if desired.

Referring again to FIGS. 3 and 4, the end edges 20, 20' of both the transverse and the longitudinal partitions 13, 14 have a notch 27, 27' therein [the] *to* assist in identifying the proper direction in which to collapse the divider 12 from its erect condition as shown in FIG. 3 to its correctly collapsed condition as shown in FIG. 4 in which the locking tabs 22, 22' appear on the same side of the divider. As seen in FIG. 4, when the divider is properly collapsed, the direction identification notches 27, 27' all face or point in a common direction.

If the divider 12 were to be collapsed in the opposite direction (not illustrated), i.e., in the direction opposite to arrows B in FIG. 3, the tabs 22, 22' would not overlap the tab retainer edges 23b, 23b' of the tab-receiving openings 23, 23' and the divider would not be rigidly interlocked in such collapsed condition. In fact, the partitions 13 and 14 would separate fairly easily, and such suggests that the divider 12 can be easily disassembled, should such become necessary for any reason, simply by collapsing the divider in the direction opposite to arrows B and then separating the partitions.

Thus has been described a divider for inserting into a bottle-carrier carton, and the partitions from which such carton divider is assembled, which achieves all of the objects of the invention.

What is claimed is:

1. A collapsible carton divider having at least one substantially planar partition and one substantially planar cross-partition interlocked therewith along an imaginary line of intersection between their respective planes, each said partition and cross-partition having parallel and opposite first and second edges and partition interlock means for interlocking with each partition which interlocks therewith, each said partition interlock means comprising means defining an open-ended slot having opposite side edges extending inwardly from said first edge thereof and being spaced apart a distance which is substantially greater than the thickness of the partition and a closed-end thereof located intermediate said first and second edges of the partition, a surface portion aligned with said slot and which determines, and extends beyond, said closed end of the latter towards said second edge of the partition, means defining a locking tab projecting from one of said side edges of said slot and [providing] *having length extending along an intermediate portion of said slot length to provide* a first abutment edge facing away from the open end of said slot *and extending adjacent, and laterally with respect to said imaginary line of intersection between the planes of the interlocked partitions*, and means defining a tab-receiving opening within said surface portion and providing a second abutment edge [aligned with said first abutment edge and also] facing away from the open end of said slot, said surface portion on each of [said] *the* interlocked partitions being received in said slot of its interlocked partition and said locking tab on each of said interlocked partitions being received in said tab-receiving opening of its interlocked partition, said interlocked partitions being pivotable in either direction along all of said lines of intersection whereby said divider may be pivoted from an open condition thereof defined by a substantially angular disposition of each said partition with [resepct] *respect* to each said interlocked cross-partition to either of two collapsed conditions thereof depending upon the direction of said pivoting from said open condition, either of said collapsed conditions being defined by a substantially adjacent and parallel disposition of each said partition with respect to each said interlocked cross-partition, [said *the* first abutment edges on the respective of said partitions respectively abutting [said] *the* second abutment edges on the respective of said interlocked partitions when said divider is in [either] *a first* of its said collapsed conditions and in its said open condition, said tab-receiving opening of each said partition further providing a tab-retainer edge aligned with said one side edge of said slot from which said locking tab projects, *each said tab-receiving opening having a configuration including respective opposite side edge portions each extending away from said tab-retainer edge to receive said locking tab of its said interlocking partition and guide the same into abutment with said tab-retainer edge as said partition and cross-partition are being interlocked, the direction of each of said opposite side edge portions being both away from said imaginary line of intersection in the direction of lateral projection of said locking tab and towards said first edge of said partition, said second abutment edge being adjacent to said tab-retainer edge*, the distance of projection of said locking tab on each of said partitions being substantially greater than the thickness of the partition whereby said locking tabs overlap the respective of said tab-retainer edges of said tab-receiving openings with which said locking tabs are respectively associated when said divider is collapsed in one direction to [a] *said* first of said two collapsed conditions thereof, all of said locking tabs in their said overlapping positions then being on the same side of said divider, and whereby disengagement of said interlocked partitions by movement of one with respect to another in either direction along any of said lines of intersection is substantially prevented when said divider is in both its said first collapsed condition and its said open condition.

2. A collapsible carton divider according to claim 1 wherein each of said one partition and cross-partition has [notch] means [at a location along one of its peripheral edges] which identifies [only] said one direction of collapsing of said divider and which directionally corresponds with similar [notch] means on the other partition when said divider is in its said first collapsed condition.

3. A collapsible carton divider according to claim 1 wherein said locking tab on each said partition and cross-partition has substantially saw-toothed configuration providing a bite-edge portion including said first abutment edge facing away from said open end of said partition slot [and], a sloping edge portion facing towards said open end of said partition slot, *and a peak edge portion of said tab conjoining* said bite-edge and sloping edge portions [conjoining to define a peak edge portion of said tab], the other side edge of said partition slot having a first length portion which extends substantially parallel to said sloping edge portion of said tab on the partition to a location therealong which is substantially adjacent to said peak edge portion of the tab and a second length portion parallel to said one *of said* side [edge] *edges* of said partition slot and conjoining with its said first length portion, said first length portion being spaced from said sloping edge portion, and said second length portion being spaced from said one side edge respective distances each of which is substantially greater than the thickness of the partition, said tab-receiving opening of each said partition having *a* configuration providing an open portion thereof substantially in alignment with said tab peak edge portion of the partition and the location of said conjoining of said first and second length portions of said other side edge of said partition slot, said open portion of the tab-receiving opening on each said partition being disposed to receive said tab peak edge portion of the other of said partitions during assembly of said carton divider.

4. A collapsible carton divider according to claim 3 wherein said other side edge of said partition slot of each said partition and cross-partition further includes a [substantially arcuate] length portion extending from said location of said conjoining of said first and second length portions thereof to the closed end of said partition slot *for engaging and urging said interlocked partition against said one side edge of said partition slot*, the [arc] *shape* of said [arcuate] length portion substantially coinciding with the locus of imaginary points generated by said closed end of said slot of the partition which interlocks therewith during assembly of said carton divider.

5. A collapsible carton divider according to claim 3 wherein each of said partitions and cross-partitions further has a partition support tab projecting from said other side edge of said slot of the partition substantially adjacent to said open end of the slot, said partition support tab projecting into said slot a distance which is less than said spacing distance between said opposite side edges thereof by an amount which is substantially equal to the thickness of that one of said partitions which is interlocked therewith whereby said interlocking therebetween is substantially rigid.

6. A collapsible carton divider according to claim 3 wherein said spacing distances are each equal to substantially twice the thickness of the partition.

7. A collapsible carton divider according to claim 3 wherein said closed end of each partition slot is disposed at a location which is midway between said first and second abutment edges of the partition, said closed ends of the respective slots of said interlocked partitions being in abutting engagement with each other thereby together defining a third abutment edge interface between each said partition and interlocked partition along said line of intersection therebetween.

8. A collapsible carton divider according to claim 1 wherein said opposite side edges of each said slot are spaced apart a distance equal to substantially twice the thickness of the partition.

9. A planar partition for assembling with at least one similar partition to make a carton divider, said partition having parallel and opposite first and second edges and a pair of opposite end edges which together define the planar area of said partition, means defining an open-ended slot having opposite side edges extending inwardly from said first edge of the partition and being spaced apart a distance which is substantially greater than the thickness of said partition for receiving the thickness of a similar partition, said slot having length extending from an open end of the slot at said first edge to a closed end thereof located intermediate said first and second edges of the partition, means defining a locking tab projecting from one of said side edges of said slot a distance substantially greater than the thickness of the partition and having length extending along an intermediate portion of said slot length to provide a first partition abutment edge facing towards said second partition edge and being spaced a distance away from said closed end of the slot, *said tab-receiving opening having a configuration including respective opposite side edge portions each extending away from said tab-retaining edge to receive said locking tab of said similar partition and guide the same into abutment with said tab-retaining edge as said partition and said similar partition are being assembled, the direction of each of said opposite side edge portions being both away from said tab-retaining edge in the direction of lateral projection of said locking tab and towards said first edge of said partition, said second abutment edge being adjacent to said tab-retaining edge*, said locking tab having substantially saw-toothed configuration providing a bite-edge portion including said first abutment edge facing towards said second edge of the partition [and], a sloping edge portion facing towards said first edge of the partition, *and a peak edge portion of said tab conjoining* said bite-edge and sloping edge portions [conjoining to define a peak edge portion of said tab], the other of said side edges of the slot extending continuously between said open and closed ends of said slot and having a length portion which extends substantially parallel to said sloping edge portion of the tab to a location therealong which is substantially adjacent to said peak edge portion of the tab [and a substantially arcuate length portion extending from said location therealong to said closed end of the slot, the arc of said arcuate length portion substantially coinciding with the locus of imaginary points generated by said closed end of said slot of said similar partition when assembling the two partitions,], said other side edge length portion being spaced from said sloping edge portion of said tab a distance which is substantially greater than the thickness of said partition, and means defining a tab-receiving opening providing a second partition abutment edge [aligned with, but] spaced away from said closed end of said slot towards said second edge of the partition and further providing a tab-retaining edge aligned with said one side edge of said slot, *and having configuration, and extending outwardly from its said tab-retaining edge to receive said locking tab of said similar partition and guide the same into abutment with said tab-retaining edge as said partition and said similar partition are being assembled, said second abutment edge being adjacent to said tab-retaining edge*, the distance between the first said partition abutment edge and said closed end of said slot being at least equal to the distance between said closed end of said slot and said second partition abutment edge.

10. A planar partition according to claim 9, wherein said distance between the first said partition abutment edge and said closed end of said slot is substantially equal to said distance between said closed end of said slot and said second partition abutment edge, whereby said closed end of said slot provides a third partition abutment edge facing towards said first partition edge.

11. A planar partition according to claim 9 wherein said other side edge of said slot includes a second length portion parallel to said one side edge of said slot and conjoining with its first said length portion, said tab-receiving opening having *a* configuration providing an open portion thereof substantially in alignment with said tab edge portion and the location of said conjoining of said first and second length portions of said other side edge of said slot and disposed to receive the peak edge portion of a similar locking tab on a similar partition during said making of a carton divider.

12. A planar partition according to claim 11 wherein the periphery of said tab-receiving opening includes a first length portion defining said open portion thereof, a straight-length portion opposite to said first length portion and defining said tab-retaining edge, and respective and opposite length portions *defining said opposite side edge portions and* extending between and joining the respective ends of said first length portion and said straight-length portion, that one of the last said length portions which is nearest said closed end of said partition slot, providing said second abutment edge of the partition.

13. A planar partition according to claim 12 wherein at least said one of the last said length portions which provides said second partition abutment edge has [substantially arcuate] shape [generally paralleling said arcuate length portion of said other side edge of said partition slot] *substantially coinciding with the locus of*

*imaginary points generated by said bite edge portion of said locking tab of said similar partition when assembling the two partitions.*

14. A planar partition according to claim 11 which further comprises a chamfered portion of said one of said side edges of said slot adjacent to said first edge of the partition, and a cross-partition support tab projecting from said other side edge of said slot at a location along the length thereof which is substantially opposite to said chamfered portion of said one side edge of the slot, said cross-partition support tab projecting into said slot a distance which is less than the distance between said opposite side edges of the slot by an amount which is substantially equal to the thickness of said partition.

15. A planar partition according to claim 9 wherein said spacing distances are each equal to substantially twice the thickness of the partition.

*16. A planar partition according to claim 9 wherein said other side edge of said slot further has a substantially arcuate length portion extending from said location therealong which is substantially adjacent to said peak edge portion of said tab, to said closed end of the slot, the arc of said arcuate length portion substantially coinciding with the locus of imaginary points generated by said closed end of said slot of said similar partition when assembling the two partitions.*

*17. A planar partition according to claim 13 wherein the other of said opposite length portions of said tab-receiving opening has shape substantially coinciding with the locus of imaginary points generated by said sloping edge portion of said locking tab of said similar partition when assembling the two partitions.*

*18. A carton divider according to claim 1 wherein said tab-receiving opening of each said partition has size and configuration permitting said locking tab on the respective of said interlocked partitions to pass therethrough to disengage said interlocked partitions when said divider is collapsed to said second of said two collapsed conditions thereof.*

*19. A carton divider according to any of claims 1–8 or 18 wherein the length of said of said tab-retainer edge on each of said partitions is substantially equal to said length of the locking tab on its interlocked partition.*

*20. A planar partition according to claim 9 wherein said tab-receiving opening extends away from its said tab-retaining edge a distance greater than said distance of projection of said locking tab and is configured to permit a similar locking tab, on a similar partition which is interlocked therewith, to pass therethrough as the interlocked partitions are pivoted in one direction into adjacent, parallel relation with respect to each other.*

*21. A planar partition according to any of claims 9–17 or 20 wherein the length of said tab-retainer edge is substantially equal to said length of the locking tab.*

* * * * *

UNITED STATES PATENT AND TRADEMARK OFFICE

CERTIFICATE OF CORRECTION

PATENT NO. : Re. 31,176

DATED : March 15, 1983

INVENTOR(S) : Wallace O. Raubenheimer

It is certified that error appears in the above—identified patent and that said Letters Patent is hereby corrected as shown below:

Column 10, line 6, "tab 22'" should read --tab 22"--.

Column 11, line 59, "[said" should read --[said]--.

Column 14, line 46, "tab edge" should read --tab peak edge--.

Signed and Sealed this

*Nineteenth* Day of *July 1983*

[SEAL]

*Attest:*

GERALD J. MOSSINGHOFF

*Attesting Officer*

*Commissioner of Patents and Trademarks*

UNITED STATES PATENT AND TRADEMARK OFFICE

CERTIFICATE OF CORRECTION

PATENT NO. : Re. 31,176

DATED : March 15, 1983

INVENTOR(S) : Wallace O. Raubenheimer

It is certified that error appears in the above-identified patent and that said Letters Patent is hereby corrected as shown below:

Column 13, lines 54-64, after the comma (,) in line 54 and before the last word "said" in line 64, delete all of the italicized wording, "said tab-receiving opening having...to said tab-retaining edge,", and substitute --said first abutment edge extending adjacent, and laterally with respect to the line of said one of said side edges of said slot,--

Column 14, lines 23-29, after the comma (,) in line 23 and before "the" (first occurrence) in line 29, delete "and having configuration, and extending...tab-retaining edge,", and substitute --said tab-receiving opening having a configuration including respective opposite side edge portions each extending away from said tab-retaining edge to receive said locking tab of said similar partition and guide the same into abutment with said tab-retaining edge as said partition and said similar partition are being assembled, the direction of each of said opposite side edge portions being both away from said tab-retaining edge in the direction of lateral projection of said locking tab and towards said first edge of said partition, said second abutment edge being adjacent to said tab-retaining edge,--

Signed and Sealed this

*Twenty-sixth* Day of *March 1985*

[SEAL]

DONALD J. QUIGG

*Attesting Officer*

*Acting Commissioner of Patents and Trademarks*